United States Patent [19]

Fan et al.

[11] Patent Number: 5,541,993
[45] Date of Patent: Jul. 30, 1996

[54] STRUCTURE AND METHOD FOR SECURE IMAGE TRANSMISSION

[76] Inventors: Eric Fan; Carey B. Fan, both of 473 Hunter La., Fremont, Calif. 94539

[21] Appl. No.: 240,347

[22] Filed: May 10, 1994

[51] Int. Cl.$^6$ ........................................................ H04N 1/44
[52] U.S. Cl. ................................................. 380/18; 380/54
[58] Field of Search ................................. 380/18, 54, 21

[56] References Cited

U.S. PATENT DOCUMENTS

| | | | |
|---|---|---|---|
| 3,541,960 | 11/1970 | Dilsner et al. | |
| 3,621,589 | 11/1971 | Jones et al. | |
| 4,459,611 | 7/1984 | Arai et al. | 380/18 |
| 4,529,870 | 7/1985 | Chaum | |
| 4,796,298 | 1/1989 | MacArthur | 380/18 |
| 4,896,355 | 1/1990 | Aggulden et al. | |
| 4,972,475 | 11/1990 | Sant'Anselmo | |
| 5,159,630 | 10/1992 | Tseng et al. | |
| 5,233,653 | 8/1993 | Katsurabayashi | 380/18 |
| 5,255,106 | 10/1993 | Castro | 380/18 |
| 5,321,749 | 6/1994 | Virga | 380/18 |
| 5,398,283 | 3/1995 | Virga | 380/18 |

OTHER PUBLICATIONS

R. A. Myers and R. A. Toupin, "Facsimile With Encrypted Hard Copy", *IBM Technical Disclosure Bulletin*, vol. 20, 11B, Apr. 1978, pp. 4994–4995.

*Primary Examiner*—David C. Cain
*Attorney, Agent, or Firm*—Skjerven, Morrill, MacPherson, Franklin & Friel; Edward C. Kwok

[57] ABSTRACT

A scrambled document or image generating method first divides a page of digitized electronic document into multiple segments arranged in a first order. The digitized electronic document is scrambled in a pseudo-random manner using a scrambling algorithm to produce a scrambled document in digitized electronic form, which can be used to print out a hard copy or visually examined on a display. In one embodiment, the scrambling algorithm receives as input one or more keys, which can be entered through a keyboard, or read from a storage medium. Descrambling of a scrambled digitized electronic document is accomplished by the original positions of the scrambled segments. The scrambled document in its digitized electronic form, or in its physically viewable form retain all information of the original image, and can therefore each be used as a source of the scrambled image.

32 Claims, 11 Drawing Sheets

*Now can you tell me what's going on?*

*Now is the time for all good people to come to*

This is a block diagram on how things could get out of hands and becomes a great fortune.

*You are getting a special treat!!*

This time we almost made it. Didn't We ?? But its not true until it is really true. Let's start the first step............ is this enough ?

This is a good demonstration, we've done it!!

What's up, I am in a flat circle?

*Now are you convinced that this is a good feature for all document transfer ?????*

*It works even on Digital T.V.*

This is a interesting document. It has pictures and words.

In the Year of 2000, Everybody will be talking on the super data highway. There will be highway police to catch speeders and traffic violators.

FIG. 13

STRUCTURE AND METHOD FOR SECURE IMAGE TRANSMISSION

BACKGROUND OF THE INVENTION

1. Field of the Invention

This invention relates to the manipulation of digital data in an electronic document or image, so as to allow such document or image to be securely communicated.

2. Discussion of the Related Art

In the past, data encryption methods were utilized to preserve privacy when data is transferred through a public environment. For example, digital encryption has been used to store data in electromagnetic storage media and for data communication, in order to protect privacy when such media is publicly accessible, or when such data communication occurs in a public network or through the mail system. As another example, the Global Positioning Satellite utilizes digital encryption techniques to encrypt its data prior to broadcasting, so as to restrict access and to protect data integrity. In data encryption, privacy is achieved by encoding clear text into ciphered text. Without proper decryption, it is extremely difficult to construct the original clear text from the ciphered text.

In general, encryption requires specific communication structures and protocols which are different from the corresponding structures and protocols used in a non-encrypted environment. For this reason, the cost of providing data encryption is high. For example, ordinary communication equipment not equipped to execute a decryption algorithm cannot receive ciphered text to reproduce the clear text. If the transmitted data is an image, until it is decrypted, even the encrypted image cannot be viewed, i.e. the image can neither be printed on a hard copy nor be displayed on a video display.

Various methods have been devised to encrypt clear text into ciphered text to preserve data secrecy in data processing and material handling applications. Examples of such methods can be found in the following classes under the current classification scheme of the U.S. Patent Office: (a) Class 283-73, Cryptogram for printed matter; (b) Class 283-17, Cryptography, viewable but with hidden meaning; and (c) class 380-54, Cryptography combined with overlay image. Patents relating to encryption can be found dating back prior to 1950's.

U.S. Pat. No. 3,718,349, entitled "Cipher Device and Method" to Albert W. Small, issued Feb. 27, 1973, discloses a cipher device and a method which utilizes a sheet having obverse and reverse surfaces. The method disclosed in the '349 patent requires matching several physical sheets of image to recover the original data. Such a ciphering process is slow, and provides only limited ciphering capability. Such method is clearly not practical for use in a data communication network.

U.S. Pat. No. 4,529,870, entitled "Cryptographic Identification, Financial Transaction and Credential Device" to David Chaum et. al., issued Jul. 16, 1985, discloses a means for processing a credit card or an I.D. card using personal keys. The device disclosed in the '870 patent is a device for coding, which cannot be used to encrypt a large document or a graphical image.

U.S. Pat. No. 4,972,475, entitled "Authenticating Pseudo-Random Code and Apparatus" to Carl Sant'Anselmo, issued Nov. 20, 1990, discloses a non-linear feedback method for encrypting two-dimensional information. The method in the '475 patent is also an encoding procedure which extends a conventional one-dimensional bar code encryption scheme into a two-dimensional coding scheme, thereby reducing the physical space requirement of the encoded data. However, such a coding process cannot be used to encrypt a large document or a graphical image.

U.S. Pat. No. 4,896,355, entitled "Patterning device for Security Facsimile Systems" to Jerry Iggulden et. al., issued Jan. 23, 1990, discloses a device which divides a document transmission into several separate partial document transmissions to maintain data privacy. However, under the method of the '355 patent, data can be compromised easily, because an unauthorized individual can easily obtain a copy of each separate partial document and reassemble the complete image. Such a method is not suitable for serious applications.

An article entitled "Facsimile with Encrypted Hard Copy" by R. Myers et al, in IBM Technical Disclosure Bulletin Vol. 20 No. 11B, pp. 4994-4995, discloses the concept of using an encrypted hard copy output from a facsimile machine. Myers et al do not provide technical information as to how such a machine capable of decrypting from an encrypted hard copy can be constructed. Myers et al discuss various problems with decryption under such approach, but provide no definite solutions. Myers et al suggest that: (i) use of error correction/detection would be necessary, and (ii) the encrypted message would have to be printed at a lower resolution, with concurrent application of a data compression algorithm.

U.S. Pat. No. 5,159,630, entitled "Facsimile Message Encryption System" to Tseng et al, issued Oct. 27, 1992, filed May 29, 1991, discloses starting and boundary markers to demarcate on a page of facsimile transmission an encrypted area, while all other areas on the page are to be transmitted as clear text. This approach restricts the amount of useful space in a facsimile transmission, and requires the user to use a facsimile transmission in an unfamiliar way, which is contrary to the common practice of sending a cover page designating recipient and routing information, to be followed by transmission of the substantive content. Under the approach of Tseng et al, the substantive content is restricted to the encryption area demarcated by the starting and boundary markers. The methods of the '630 patent are hence cumbersome to apply.

Finally, a policy issue being considered by law enforcement agencies today relates to the use of encryption by criminals to communicate with each other in furtherance of criminal activities. Law enforcement agencies would prefer to acquire decryption keys to all commercially available encryption devices, so as to allow such law enforcement agencies to decrypt any encrypted message under appropriate circumstances and procedures (e.g. under a court order). For example, there has been significant debate surrounding the encryption standard of the "clipper" integrated circuit. The public and equipment manufacturers in the private sector are vociferously resisting the requirement that governmental agencies be given "master keys" to commercial encryption equipment. It is therefore desirable that a method for protecting data privacy be devised according to which government agencies can, with only moderate difficulty, recover clear text from a protected message, while at the same time providing adequate data privacy for most commercial applications.

SUMMARY OF THE INVENTION

The present invention provides a method for document communication, which maintains data privacy both in digitized electronic form and in physical printed form, and which allows data communication to utilize existing communication equipment and software with no alteration of existing data communication format and structures. The methods of scrambling and descrambling under the present invention can be implemented in software or hardware. In a hardware implementation, the present invention can be achieved using either discrete components, or as an application-specific integrated circuit.

In accordance with the present invention, a method is provided for scrambling an image. Such a method includes the step of receiving at least one scrambling key. Under this method, the image is first stored in a storage device as image data in accordance with a first data structure. The method then further divides the image data into multiple data segments, where each data segment contains image data corresponding to one of multiple designated areas covering the image. The data segments correspond to the designated areas in the image under a first mapping. The present invention scrambles the data segments in a pseudo-random manner using a scrambling algorithm which receives as input the scrambling key. The output of the scrambling step provides a scrambled image formed by associating the data segments and the designated areas under a second mapping, which is different from the first mapping. The scrambled image can be printed out or displayed on a display device for viewing by the user.

In one embodiment, a second scrambling key is used. The present invention contemplates using only one key, only one of two keys, or multiple keys. In one embodiment, a sophisticated key providing parameters of an encoding scheme can be stored in a non-volatile storage medium which is portable by the user. In such a scheme, key tables, i.e. long key sequences, or data specifying or used with a scrambling or descrambling algorithm can be stored in the non-volatile storage. In one embodiment, the input keys may be combined with predetermined keys to generate multiple secondary keys.

In one embodiment, the scrambled image in the second data structure is converted to a format suitable for data transmission. In another embodiment, the scrambled image can be displayed on a visual display or printed on a printer.

To descramble a scrambled image, the mapping created between data segments and designated areas in the clear text are restored by reversing the scrambling step. There is no information loss due to scrambling or descrambling, when the scrambling and descrambling algorithms are chosen to map the designated areas and the data segments one-to-one. In one embodiment, the scrambled data is retrieved into a data file for descrambling by scanning the scrambled image from a hard copy.

In one embodiment, the input image is divided into multiple horizontal strips ("lines"), and scrambling is accomplished by rearranging the order of the lines. In addition, within each line, the data segments can also be rearranged. The order of the rearranged data segment may also vary from line to line. Furthermore, within each segment, the image data contains information of colors present at the corresponding area of the image. Further scrambling can be achieved by remapping the colors in each data segment. In one embodiment, where the colors are represented as binary bits, remapping can be achieve by an exclusive-or operation on the binary bits.

In accordance with another aspect of the present invention, the present invention provides a page of image, where such a page includes a boundary enclosing an area designating that any image enclosed within the area is to be scrambled. Such a boundary simplifies alignment of the scrambled image for descrambling. In this invention, a scrambled page can be printed with one or more alignment marks generated during the scrambling process to help position a scrambled image for descrambling. In addition, in the context of a facsimile transmission, a document to be transmitted often includes a cover page used to identify the content of the transmission, routing information and the intended recipient. Normally, such a cover page should not be scrambled. Thus, the present invention provides a marker which includes a machine-readable distinctive design that can be affixed to a designated area of a sheet of paper to specify that any image printed on such a sheet of paper is to be transmitted in a facsimile transmission as clear text. The method of the present invention recognizes such a marker and by-passes the scrambling step for each page on which such a marker is affixed. Such a marker can be printed on paper coated on one side with an adhesive material, so that the marker can be affixed as a "sticker" to such a sheet of paper at transmission time. Such a marker can also be used to define a clear text area within which a message intended to be transmitted as clear text can be included. In that instance, the process to recognize such a marker would also recognize the clear text area, so that scrambling and descrambling is bypassed for the clear text area.

In this invention, data scrambling is performed without modifying the data structure of the image data. The scrambling procedure does not impose any requirement on the method of image transmission. Thus, with respect to the data communication channel interface equipment used to transmit a scrambled image, the scrambled image can be treated as no different from any clear text image data. Thus, the present invention imposes no requirement on the communication environment. The scrambled image of the present invention conforms to all existing communication environment as to equipment interfaces, data compression algorithms, and other standards. For this reason, other encryption or security schemes can still be implemented concurrently on the scrambled image of the present invention, thereby further enhancing data security.

Further, in the embodiment where lines or segments of the image are simply rearranged, or its colors reassigned, in a pseudo-random manner, law enforcement agencies can reconstruct clear text of a scrambled image with only moderate difficulty and without having to resort to knowledge of the descrambling keys. The present invention would still provide sufficient data privacy protection, without handing over to law enforcement agencies descrambling keys.

BRIEF DESCRIPTION OF THE DRAWINGS

FIG. 13 shows an unscrambled image reconstructed from the scrambled image of FIG. 12 using the authorized M-key and E-key, in accordance with the present invention.

DETAILED DESCRIPTION OF THE PREFERRED EMBODIMENTS

The present invention is applicable to electronic transfer of images in general including, but not limited to, transfer of images using a facsimile machine. Further, although the description below illustrates the present invention using as an example a stand-alone facsimile machine, the present invention is equally applicable, for example, to a facsimile machine which is part of a computer system. Typically such a facsimile machine would include a personal computer, a "fax modem", an user interface software package, and control software to control data transfer between the personal computer and the fax modem. In an implementation where paper "hard copies" of images are not involved, the images are stored in data structures, such as data files stored in an electronic or a magnetic storage medium.

The present invention provides data scrambling of an image ("digitized electronic document") at the level of a data structure of the graphical image. The scrambling method of the present invention creates a document which is not only viewable as if it is clear text, i.e. with no change in data structure, but also contains all the graphical information of the digitized electronic document. The image scrambling is therefore modular in that existing equipment can be used to transmit or receive the scrambled image. Transmission of a scrambled image, as a facsimile, a data file, or as electronic mail, is useful in situations where the image can be seen or read publicly by others other than by the intended recipient. For example, business or personal facsimile transmissions are often sent to an individual in an office, in a hotel, or a public environment, where the receiving apparatus is shared among many users and are attended to by operators who should not be privy to the transmitted information. With a scrambled image, the privacy and data integrity of the transmitted image is not compromised, even though the scrambled image can be seen publicly. Consequently, the scrambled image can be delivered through an unsecured conduit, e.g. a messenger, without risking a loss of privacy or security. Upon receipt of the scrambled document, the intended recipient can recover the clear text image using the scrambling methods explained below.

Figure 1:
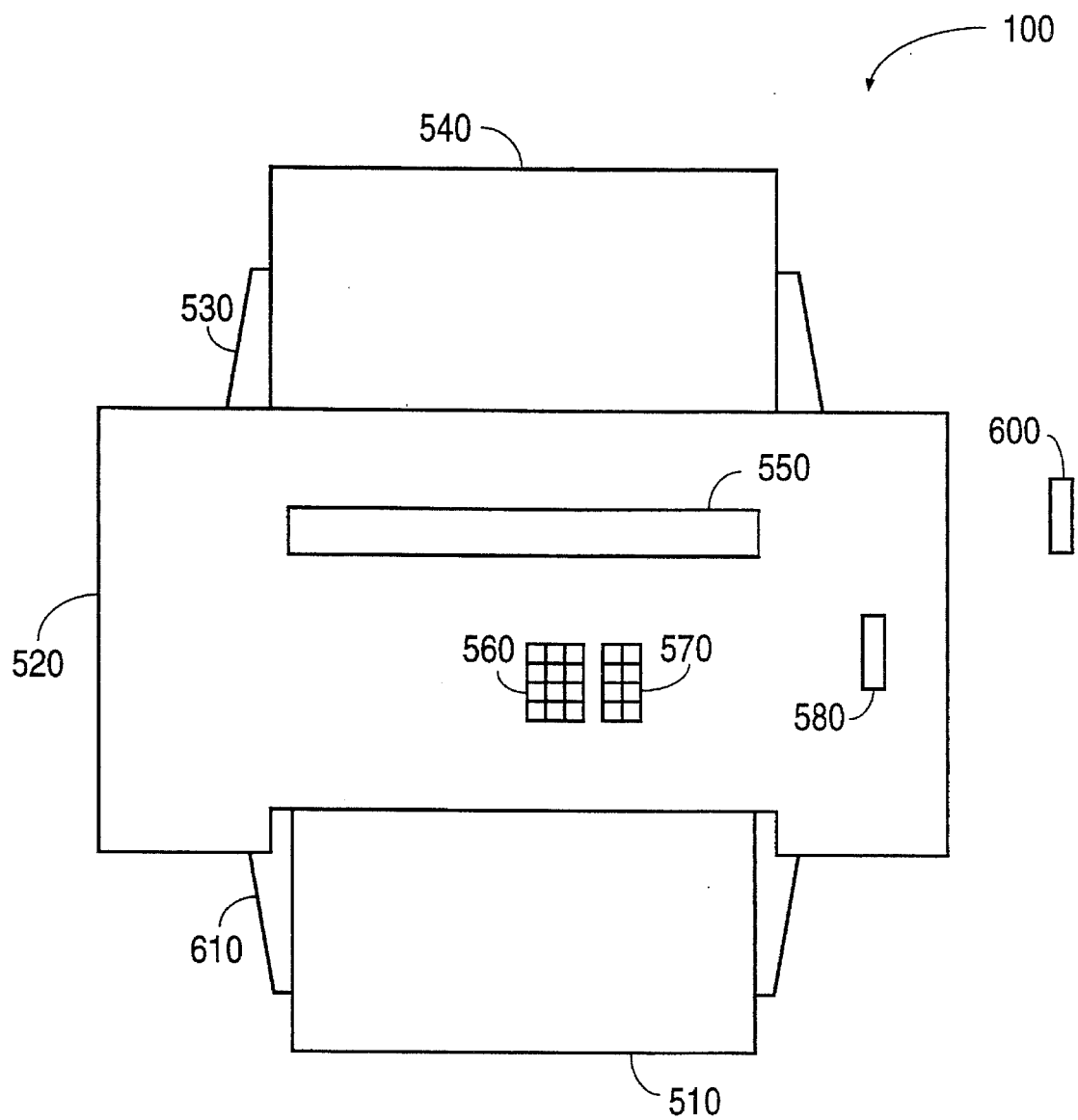
FIG. 1 illustrates a top view of facsimile machine 100, which uses the image scrambling and descrambling method of the present invention.

FIG. 1 is a top view of a facsimile machine 100 using the image scrambling and descrambling method of the present invention. As shown in FIG. 1, facsimile 100 has a housing 520, to which a paper input tray 610 holds one or more sheets of paper, indicated by reference numeral 510, for individual input into facsimile machine 100. On each sheet of paper 510 may be printed a clear text image or a scrambled image of the present invention. The output images of facsimile machine 100 are printed on one or more sheets of paper, indicated by reference numeral 540, which are held in paper tray 530. Each of these output images can be a scrambled image of the present invention, or a descrambled image resulting from an input scrambled image fed into facsimile machine 100.

To activate image scrambling or descrambling, a sequence of codes ("M-key") constituting a "pass word" is entered through keyboard 560. Alternatively, image scrambling or descrambling can also be activated by a second sequence of codes ("E-key") stored in a machine-readable E-key storage medium 600, which can be read by facsimile machine 100. E-key storage medium 600 can be a non-volatile electronic memory, a magnetic card, a diskette, or any other device suitable for non-volatile storage of information. The M-key and the E-key need not be the same sequence of codes.

To transmit a clear text image as a scrambled image, or to descramble a scrambled image received, the user places a sheet of paper containing the clear text or scrambled image into paper tray 610. Then, to provide the key to be used in the scrambling or descrambling process, either the M-key is entered on keyboard 560, or an E-key storage medium 600 is inserted into slot 580. One or more designated keys or switches are provided on keyboard 570 to activate scrambling or descrambling in facsimile machine 100. Of course, slot 580 represents the input slot of a reader suitable for reading the information stored in E-key storage medium 600. In one implementation, slot 580 is also provided with a write or record ability, so that an E-key can be stored into E-key storage medium 600 by plugging E-key storage medium 600 into slot 580 and pushing one or more designated keys on keyboards 560 and 570. In that implementation, duplicate E-keys can also be created. For security purpose, a "clear" key is provided on keyboard 570 to clear the E-key from memory immediately after transferring an E-key to an E-key storage medium.

As shown also in FIG. 1, an interactive display 550 provides visually operational or error information to an operator of facsimile machine 100. Keyboard 570 provides the command keys or switches for controlling the operation of facsimile machine 100. Keys on keyboard 570 include an alphanumeric keyboard (or in some instances, only a numeric keyboard) and such keys for activating in sequence the scanning of input images from the paper 510 in paper tray 610, or for the scrambling of the scanned images using an M-key, an E-Key or both.

Figure 2:
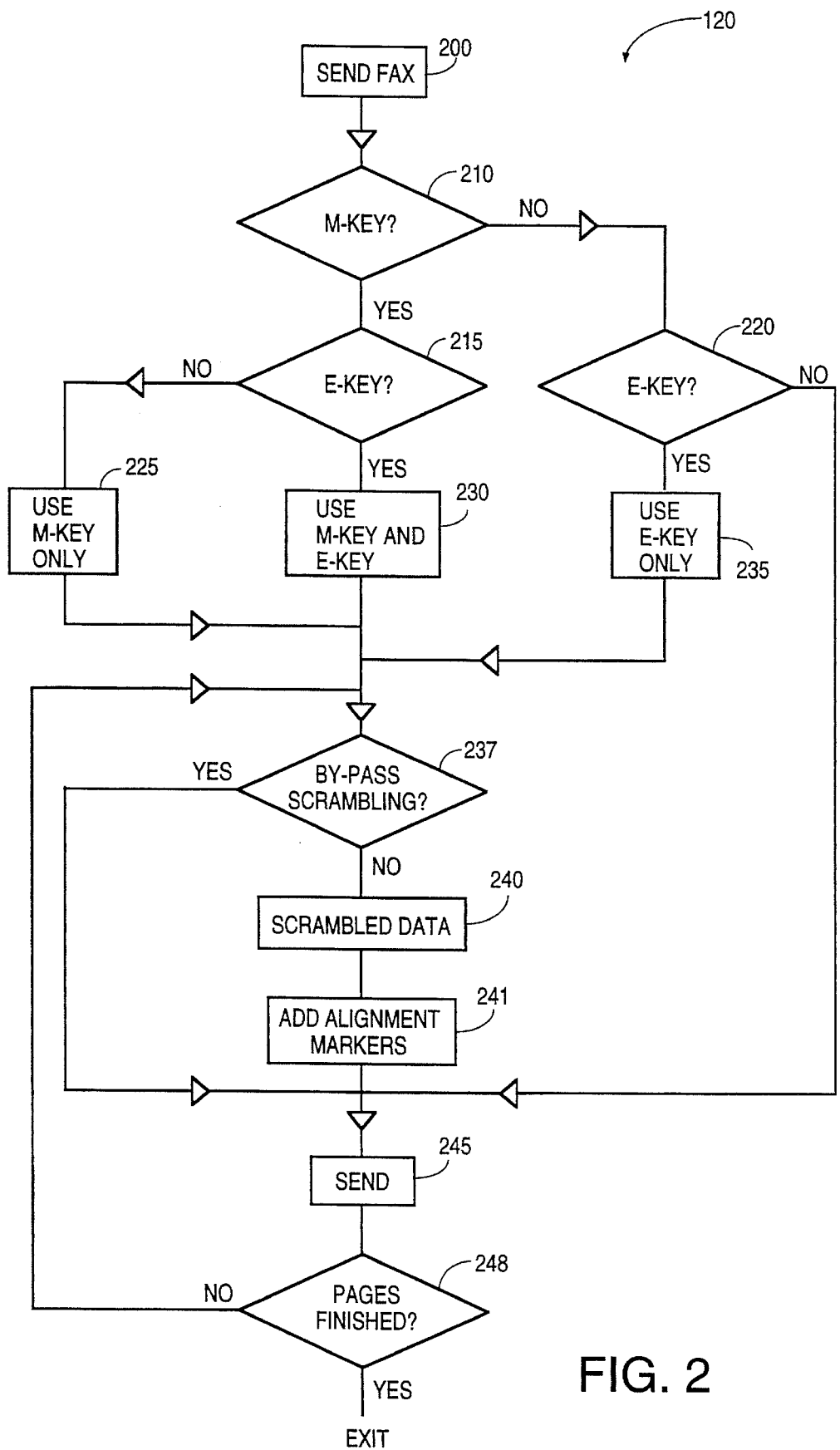
FIG. 2 is a flow diagram showing the steps taken by facsimile machine 100 for transmitting an image.

FIG. 2 is a flow diagram of the control sequence ("state machine") 120 of facsimile machine 100 for sending a scrambled image. In FIG. 2, the "send fax" step 200 represents an operator initiating the "send fax" command by pushing one or more designated keys on keyboard 570. At step 210, state machine 120 checks if an M-key is entered by the operator. An M-key is entered by pushing the alphanumeric or numeric keys on keyboard 560. Alternatively, a designated key on keyboard 570 is use, to indicate that no M-key is to be entered. Regardless of whether an M-key is entered, state machine 120 checks if an E-key would be used by checking if an E-key storage medium is plugged into slot 580. Step 215 represents checking for an E-key when an M-key is entered, and step 220 represents checking for an E-key when an M-key is not entered. If neither an M-Key is entered nor a E-key is plugged in, a clear text image is transmitted, as indicated in FIG. 2 by the line which proceeds from step 220 to step 245, which is labelled "SEND". Alternatively, if an M-key is not entered and an E-key is provided, the image or images are to be scrambled using the E-key only, the configuration parameters in facsimile machine 100 used for an "E-key only" scrambling are set at step 235. Similarly, if both an M-key and an E-key are provided, the image or images are to be scrambled using both the E-key and the M-key, the configuration parameters in facsimile machine 100 used for an "E-key and M-key" scrambling are set at step 230. Otherwise, the image or images are to be sent using the M-key only, the configuration parameters for an "M-key only" scrambling are set at step 225.

Figure 11:
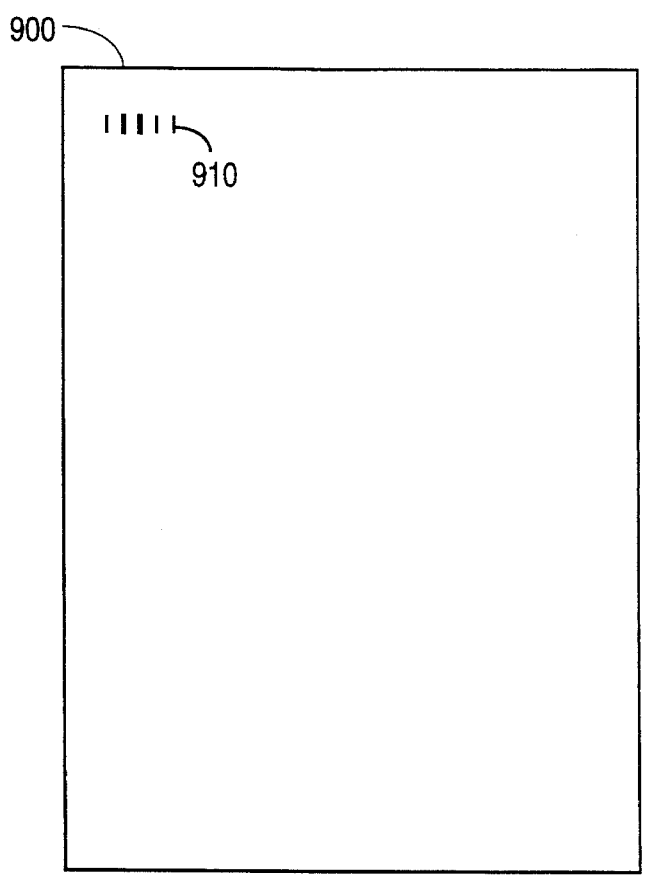
FIG. 11 shows a sheet of paper 900 on which is imprinted or attached a scrambling by-pass marker 910 for indicating that the image on paper 900 is to be transmitted as clear text.
Figure 14:
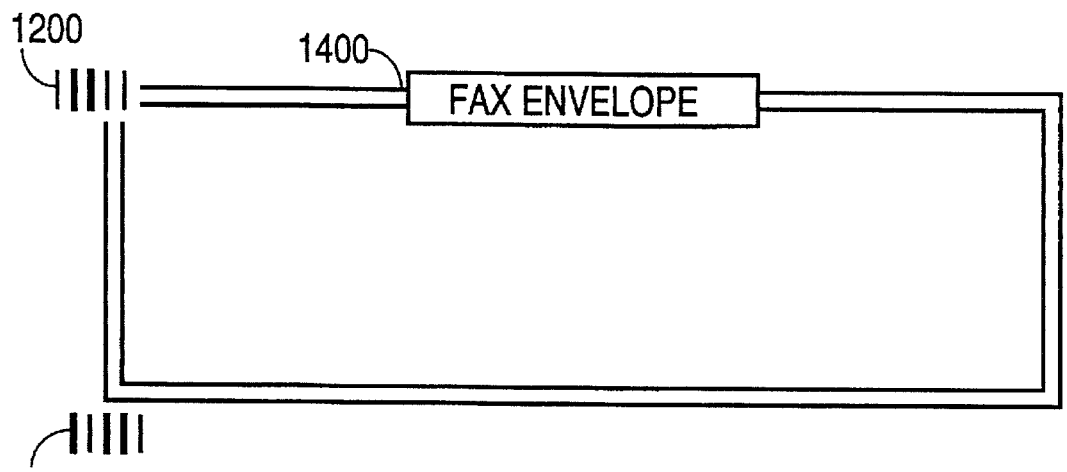
FIG. 14 shows by-pass markers 1200 and 1500 defining an area 1400; an image in area 1400 is to be transmitted as clear text.
Figure 15:
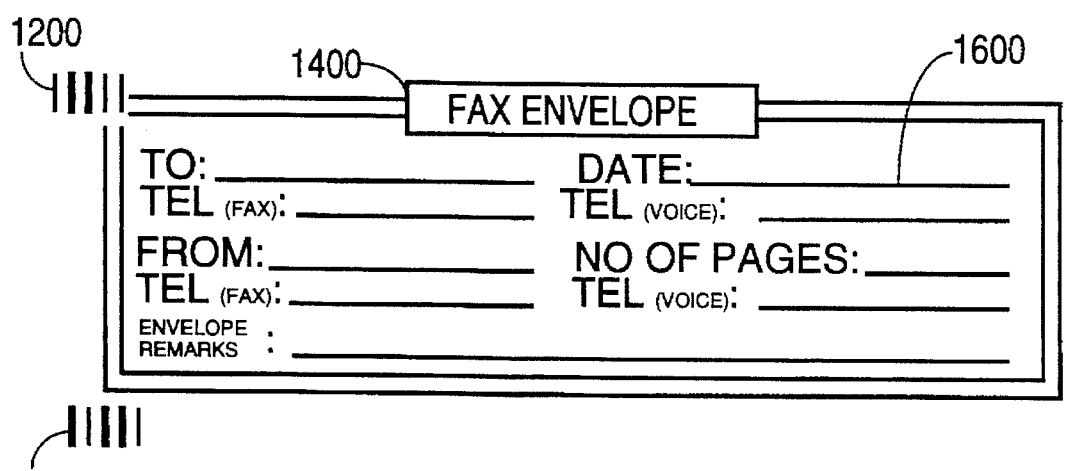
FIG. 15 shows one application of FIG. 14's bypass markers 1200 and 1500 defining a typical facsimile envelope message 1600 within area 1400.

At step 237, facsimile machine 100 retrieves a sheet of paper from paper tray 610, and scans in the image on the paper retrieved. State machine 120 then checks if the image contains a scrambling by-pass marker. The scrambling by-pass marker is a special marker indicating to state machine 120 that, despite a scrambling configuration is set at step 225, 230, or 235, the present scanned image is to be transmitted as clear text. The scrambling by-pass marker is useful, for example, on a cover sheet to provide in clear text an identification of the intended recipient and any appropriate routing information, so that the scrambled images to follow can be routed to the intended recipient. The scrambling bypass marker can be any machine-recognizable symbol or code. For example, a special bar code located within a special area can be used. Such special markers can be provided as adhesive "stickers" to be attached on the page containing the image to be sent as clear text. Alternatively, the special bypass marker can also be generated by a electronic word processor, or as printed on pre-printed stationery. An example of a scrambling bypass marker 910 on a sheet of paper 900 is shown in FIG. 11. A variation of the special bypass marker is an area bypass marker defining an area which is to be excluded from scrambling. Such area bypass markers are shown in FIGS. 14 and 15 as area bypass markers 1200 and 1500 and discussed in further detail below.

If a scrambling by-pass marker is detected, state machine 120 proceeds to step 245 to transmit the scanned image as a clear text image. Otherwise, step 240 is entered, during which facsimile machine 100 scrambles the scanned image in accordance with the configuration parameters set at the step 225, 230 or 235. Facsimile machine 100 then adds alignment markers to the scrambled image and transmits the scrambled image at step 245. Alignment markers are provided to help position the scrambled image for descrambling. In the case of an area bypass marker, when such an area bypass marker is detected, the area specified by the area bypass marker is excluded from scrambling. At step 248, state machine 120 checks, if all pages in paper tray 610 have been transmitted. If there are more pages in paper tray 610, state machine 120 returns to state 237 to scan the next input image from the sheet of paper next retrieved from paper tray 610.

Figure 12:
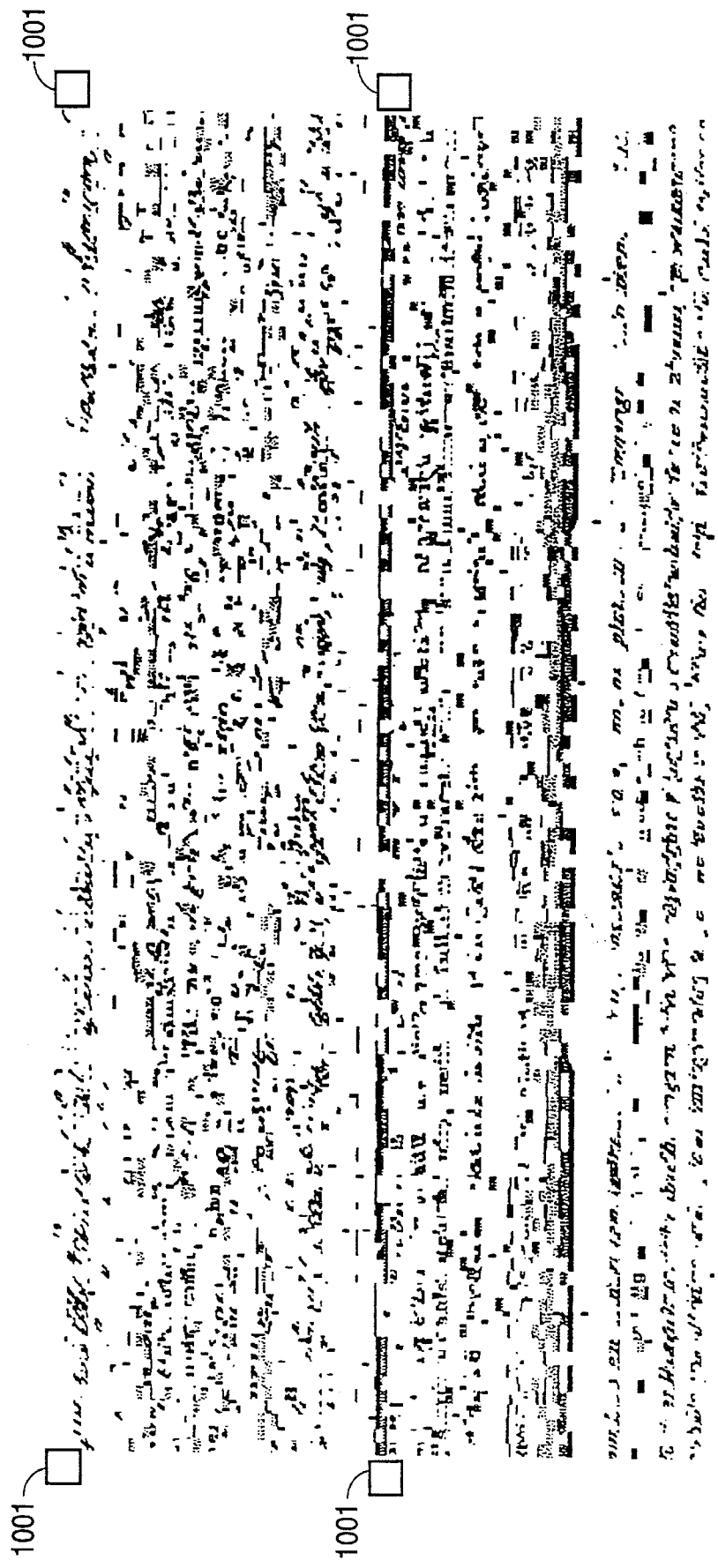
FIG. 12 shows a printed scrambled image including alignment markers 1001, using both an M-key and an E-key, in accordance with the present invention.

FIG. 12 shows a scrambled image, including alignment markers 1001, transmitted from a facsimile machine of the present invention which would be received by another facsimile machine. This scrambled image can be unscrambled using the unscrambling method of the present invention described below with the M-key, the E-key, or both. FIG. 13 shows an unscrambled image reconstructed from the scrambled image shown in FIG. 12.

Figure 3:
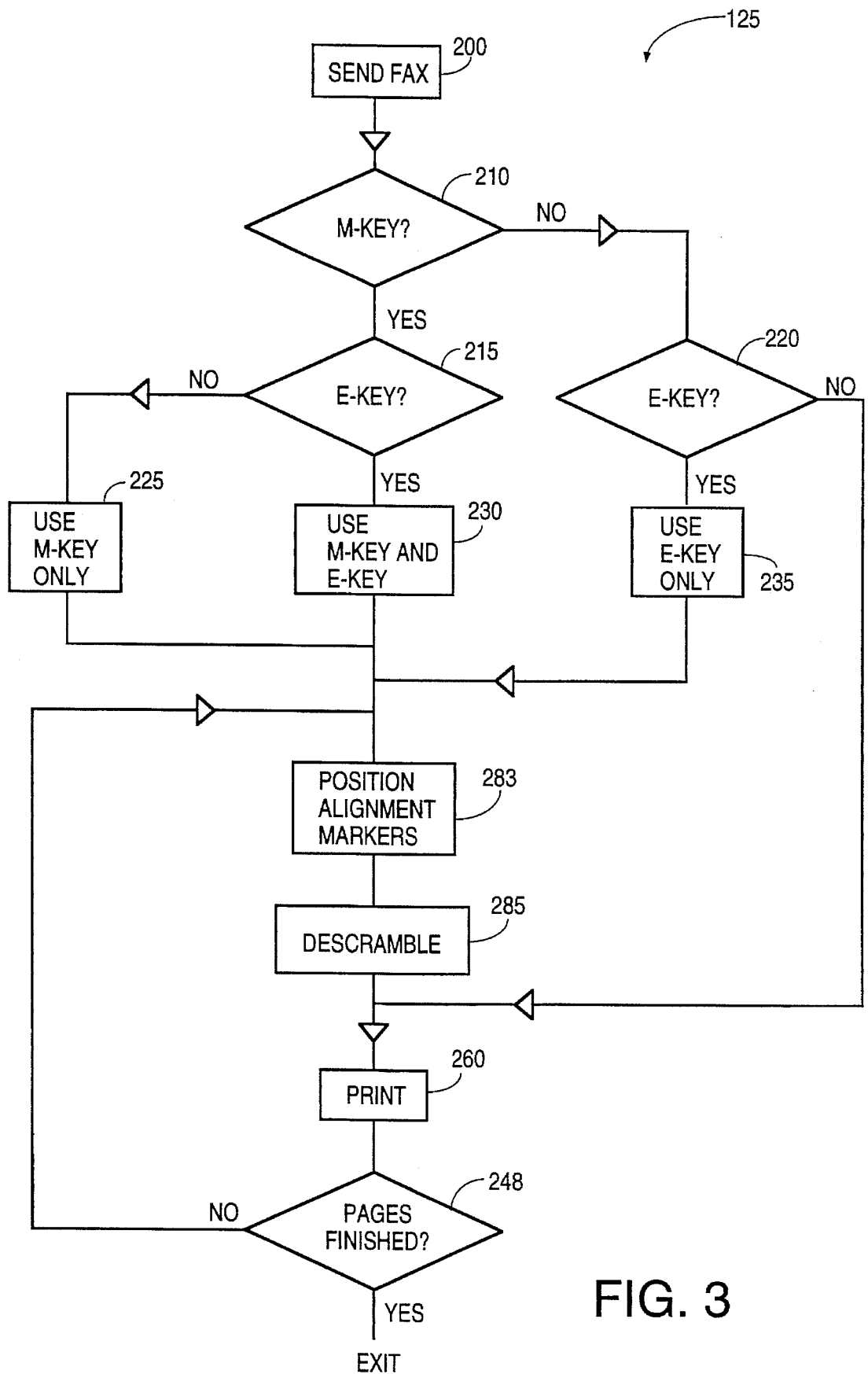
FIG. 3 is a flow diagram showing the steps taken by facsimile machine 100 for descrambling an image.

FIG. 3 is a flow diagram showing the control sequence ("state machine") 125 for descrambling scrambled images fed into facsimile machine 100. The steps for specifying an M-key, or an E-key, or both, for the descrambling process are similar to the steps for specifying the corresponding keys described in conjunction with FIG. 2. To minimize repetition, these steps are not described again. To facilitate reference, steps in FIG. 3 which correspond substantially to those in FIG. 2 are given the same reference numerals. To descramble a scrambled printed document or a scrambled digitized electronic document which is saved in an electronic storage device, and restore the clear text corresponding to the scrambled document, facsimile machine 100 can be activated when the corresponding M-key and E-key are specified. At step 250, an operator places the scrambled images in paper tray 610, and pushes one or more control keys on keyboard 570 to initiate the descrambling steps. The M-key, the E-key, or both, are entered and are used to configure facsimile machine 100 in steps 210, 215, 220, 225, 230 and 235 in substantially the same manner as described above with respect to FIG. 2. When the M-key, the E-key, or both keys are specified, the scrambled image is scanned into facsimile machine 100, aligned at step 283 according to the alignment marks and descrambled according to the present invention at step 285. The descrambled image, i.e. the clear text image, is then printed and output in step 260 to output paper tray 530.

Figure 4:
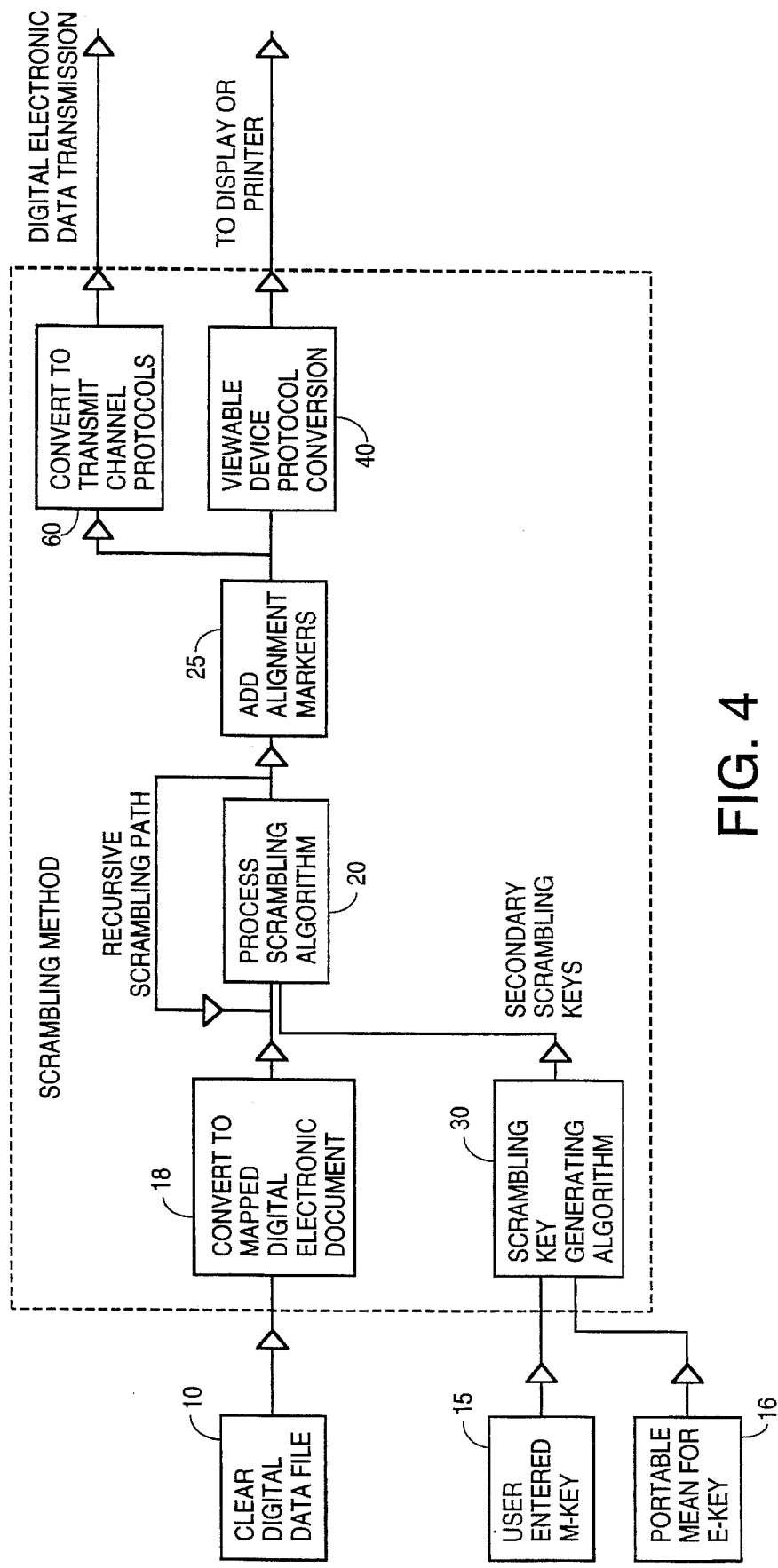
FIG. 4 illustrates the operation of a data scrambling method suitable for use in steps 240 and 241 of FIG. 2.

FIG. 4 illustrates the operation of a data scrambling method suitable for use in steps 240 and 241 of FIG. 2. As shown in FIG. 4, the input data to the method of FIG. 4 includes an M-key 15 entered by an operator, an E-key 16 read from a storage medium, such as E-key storage medium 600, and the data of a scanned image, represented generally by data file 10. M-key 15 and E-key 16 are provided to scrambling key generating module 30, which implements an algorithm described more fully below in conjunction with FIG. 6, to generate a set of secondary scrambling keys.

Data file 10 is either created by a scanner in facsimile machine 100 or received in a standard facsimile format over a communication link. Data file 10 is mapped into a "mapped digitized electronic document" by mapping module 18. Mapping module 18 divides the image in data file 10 into rectangular strips ("lines"), and then divides each line into a predetermined number of "segments". Each segment is then stored in the mapped digitized electronic document along with an index specifying the physical location, i.e. line number and segment number, of the segment in the image.

Using the secondary scrambling keys generated by scrambling key generating module 30 and conversion module 18, processing module 20 generates a "scrambled digitized document". The operation of processing module 20 is described in further detail below in conjunction with FIGS. 7, and 9. At the operator's option, scrambling key generation module 30 can provide multiple scrambling keys. With multiple scrambling keys, the scrambled digitized document at the output of processing module 20 can be fed back multiple times, so as to be scrambled recursively using the multiple keys from scrambling key generating module 30. Block 25 represents a module which adds alignment markers to the scrambled image. As mentioned above, such alignment markers are useful to facilitate proper positioning of the scrambled image for descrambling from a hard copy scrambled image. Blocks 40 and 60 represent data format conversion modules, which translate a scrambled digitized document to a format compatible with the protocols of various equipment receiving the scrambled image. For example, block 40 represents conversion to a protocol which can be used by a display device, such as a printer or a graphical display, for generating a physically viewable scrambled document. Block 60 represents conversion to a protocol suitable for transmitting over a communication link, such as a telephone line, to a receiving device, such as another facsimile machine.

Figure 5:
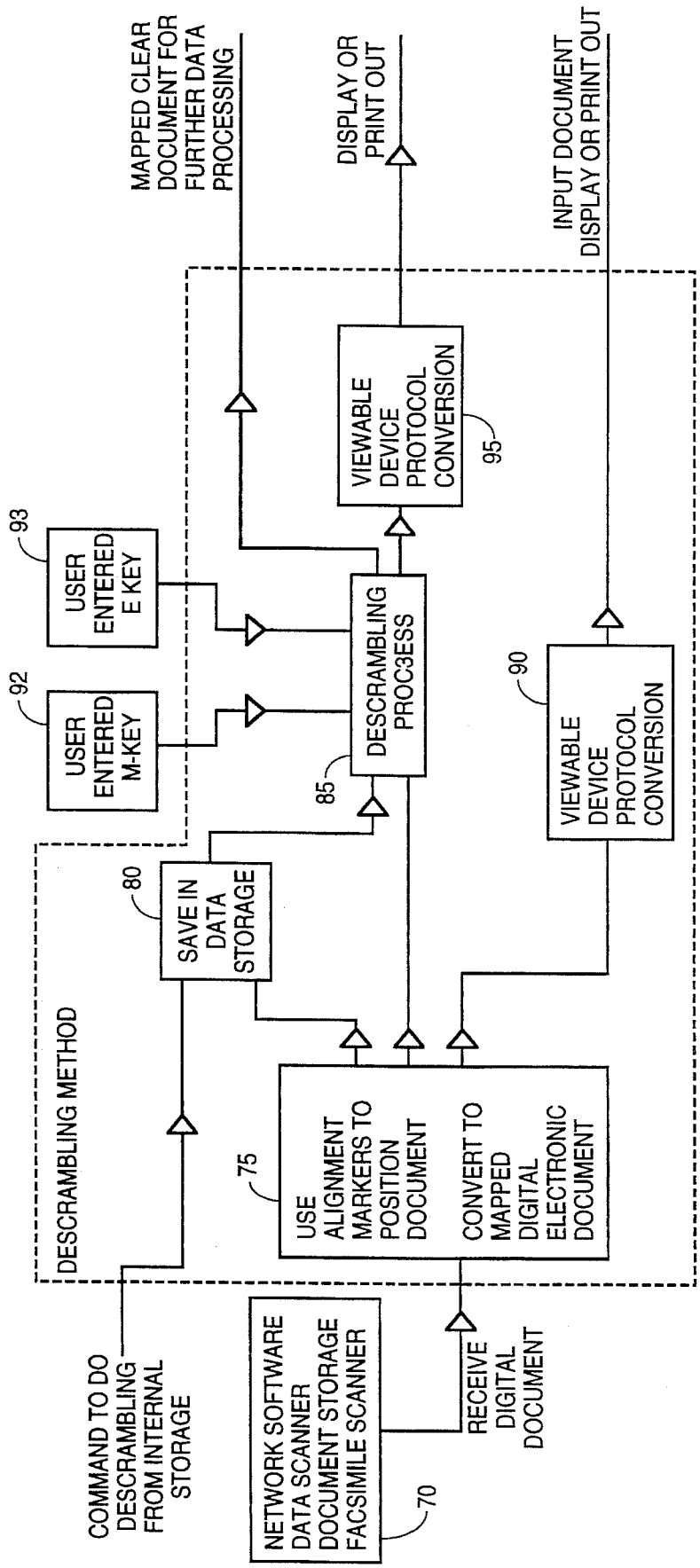
FIG. 5 illustrates the operation of a data descrambling method suitable for use in steps 283 and 285 of FIG. 3.

FIG. 5 illustrates the operation of a data scrambling method suitable for use in steps 283 and 285 of FIG. 3. Descrambling in facsimile machine 100 can be performed on a scanned scrambled image (represented in FIG. 5 by the block labelled 70) or from a mapped scrambled digitized document stored within facsimile machine 100 (represented in FIG. 5 by storage module 80). The scanned scrambled image can be provided by a source such as network software, data scanners, stored scrambled document or a facsimile scanner. As illustrated in FIG. 3, descrambling can be performed using an M-key, an E-key or both. In FIG. 5, these scrambling keys are represented by blocks 92 and 93.

A received digitized document is, aligned according to the alignment markers on the scanned scrambled image, and converted to a mapped digitized electronic document by conversion module 75. The mapped digitized electronic document created by conversion module 75 can be stored in a data storage memory or device as shown in block 80. Alternatively, the mapped digitized electronic document created by conversion module 75 can also be directly fed into descrambling module 85, or be converted by conversion module 90 into a form suitable for display or print out.

Descrambling module 85 uses either a user-provided M-key (represented by block 92) or an E-key (represented by block 93), or both, to descramble an input mapped digitized document. The descrambling algorithm used by descrambling module 85 includes the same key generating algorithm as described in conjunction with FIG. 4's scrambling key generation module 30, to generate the secondary keys, and an algorithm which reverses the scrambling process described in conjunction with FIG. 4's processing module 20. As shown in FIG. 5, descrambling module 85 provides as output a descrambled mapped digitized document, which can then be provided for further data processing (represented by output path 97, or converted by conversion module 95 for display or print out.

The operations of block 70, conversion module 75, storage module 80, and conversion modules 90 and 95 can be implemented using methods familiar to those of ordinary skill in the art. Thus, more detailed descriptions of block 70, conversion module 75, storage 80, and conversion modules 90 and 95 are therefore omitted.

Figure 6:
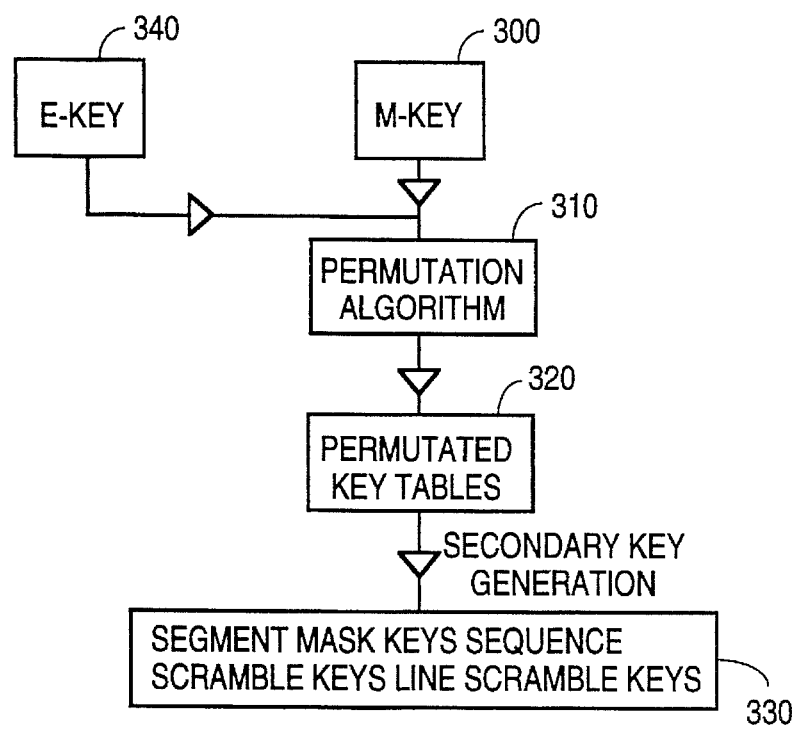
FIG. 6 shows a method for creating from an M-key, an E-key, or both, secondary keys for scrambling or descrambling operations.

FIG. 6 shows a method of creating from an M-key, an E-key, or both, secondary keys for scrambling or descrambling operations. In this embodiment represented by FIG. 6, E-key 340 can be a key table, a specified key permutation algorithm, or both. As mentioned above, an E-key can be stored in an electronic portable media or hardware circuits. M-key 300 is entered from keyboard 560 at the time of image transmission or image reconstruction from a scrambled image. As shown in FIG. 6, E-key 340 and M-key 300 can singly, or in combination, be used as input to the permutation algorithm 310, which generates key tables 320. Key tables 320 can each be used in their original forms or further permuted to create key tables in block 330. Block 330, depending on the scrambling or descrambling method used, generates one or more of the followings secondary keys: (i) line scramble keys, which are used in a line scrambling technique, such as described in conjunction with FIG. 7 below; (ii) sequence scramble keys, which are used in a line segment sequence scramble technique, such as described in conjunction with FIG. 8 below; and (iii) segment mask keys, which are used in a segment mask to change color, such as described in conjunction with FIG. 9 below. Line scrambling keys specify the scrambling of lines. Sequence scrambling keys specify the scrambling of the segments within each line. Segment mask keys are used to address a table which maps the colors of each segment to a new set of colors to provide further data protection.

Many known algorithms can be used to generate secondary keys. Standard encryption algorithms such as DES or other methods, which are familiar to those of ordinary skill in the art can be utilized to generate secondary keys. The choice of algorithm affects the level of security attained, since the level of security attained depends upon the robustness of the encryption algorithm.

In one implementation, an E-Key consists of a complete table of keys $E(n)=\{E(1), E(2), E(3), E(N)\}$, which consists of consecutive numbers between 1 to N arranged according to a pre-determined random sequence, where N can be the total number of segments within a line, the total number of lines, or the total number of colors to be scrambled. Holders of E-keys need not know or memorize the random sequence of $E(n)$. $E(n)$ is typically generated using a random number generator algorithm. As mentioned above, E-keys are stored in a portable storage media. The same E-key used for the scrambling operation, or a duplicate of that same E-key, must be used for the descrambling process.

In one implementation, an M-key can be provided by a sequence of key strokes M entered from a numeric keypad, or an alpha-numeric keypad, which can be represented by the multiple-byte digital number formed by the concatenation of the ASCII symbols in M.

The sequence of secondary keys $K(n)=\{K(1), K(2), K(3), \ldots, K(N)\}$ is derived from an E-key, an M-key, or if both keys are used, from both an E-key and an M-key. $K(n)$ determines the scrambling sequence of the actual data segments or data lines. In one embodiment, a pre-assigned sequence of key modifiers $S(n)=\{S(1), S(2), \ldots, S(N)\}$ is provided. In that embodiment, the sequence of secondary keys $K(n)$ is derived by assigning the next unused number of modulo N of $(E(n)+S(n)+M)$[1]. One of ordinary skill in the art would be able to derive software programs or circuits to implement the secondary key sequence $K(n)$. A secondary key sequence is synthesized for each of line scrambling, segment scrambling with each line, and segment masking.

[1] This method can sometimes generate repeated numbers. Since each number in the sequence must be unique, i.e. each segment must be given a unique position, when a number so generated is identical to a number already in the sequence, the next unused number is selected for the sequence.

Figure 7:
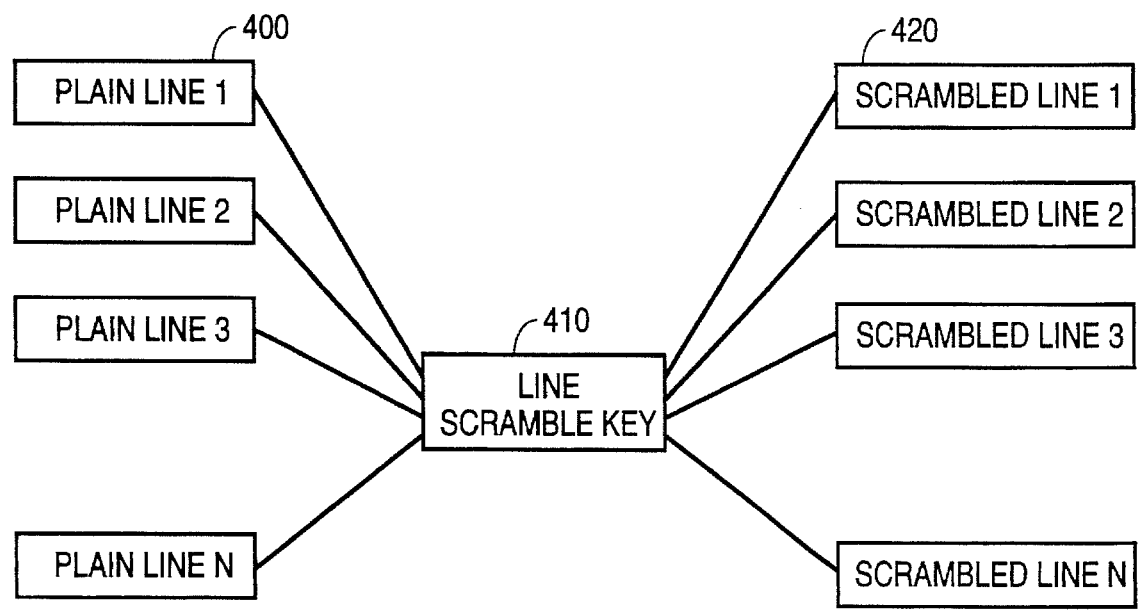
FIG. 7 illustrates a line scrambling method using a secondary key sequence represented by the block 410.

FIG. 7 illustrates a line scrambling method using a secondary key sequence represented by the block 410. In the method of FIG. 7, each line p of the clear text document is relocated to the position K(p) specified by the secondary key sequence K(n). Thus, a scrambled document is constructed by scrambling the lines of the clear text document. As is evident, the mapping between the clear text lines and the lines of the scrambled document is one-to-one. Hence, the descrambling process can be simply achieved by providing the inverse mapping from the scrambled document to the clear text document.

Figure 8:
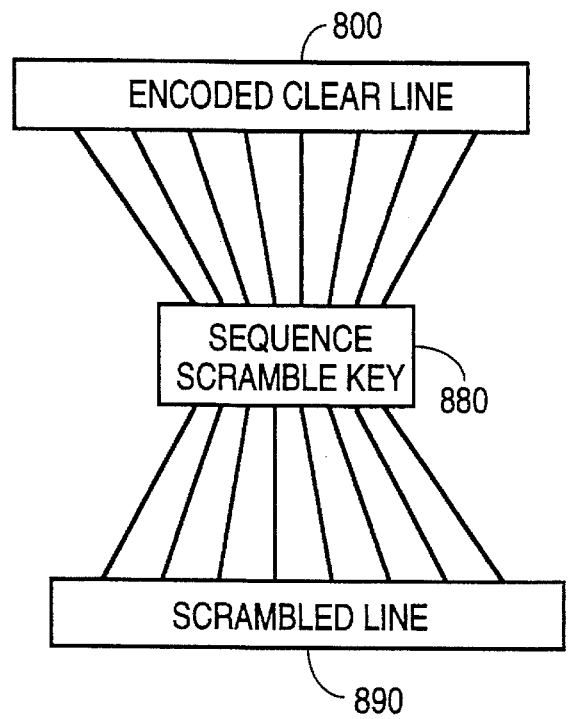
FIG. 8 illustrates a line segment sequence scrambling method using a secondary key sequence K(n), which is represented by the block 880.

FIG. 8 illustrates a line segment sequence scrambling method using a secondary key sequence K(n), which is represented by the block 880. As shown in FIG. 8, a clear line 800 is divided into N segments. The secondary key sequence 880 relocates each segment p to the corresponding position K(p) specified by the secondary key sequence K(n) in the scrambled line 890. The line position of the scrambled line 890 can be specified by the scrambling method illustrated in FIG. 7. A different secondary key sequence K(n) can be provided to each line of a document to enhance security. As is evident also, the mapping between the segments of line 800 and the segments of scrambled line 890 is one-to-one. Hence, the descrambling process can be simply achieved by providing the inverse mapping from the segments of the scrambled line to retrieve the clear text line.

Figure 9:
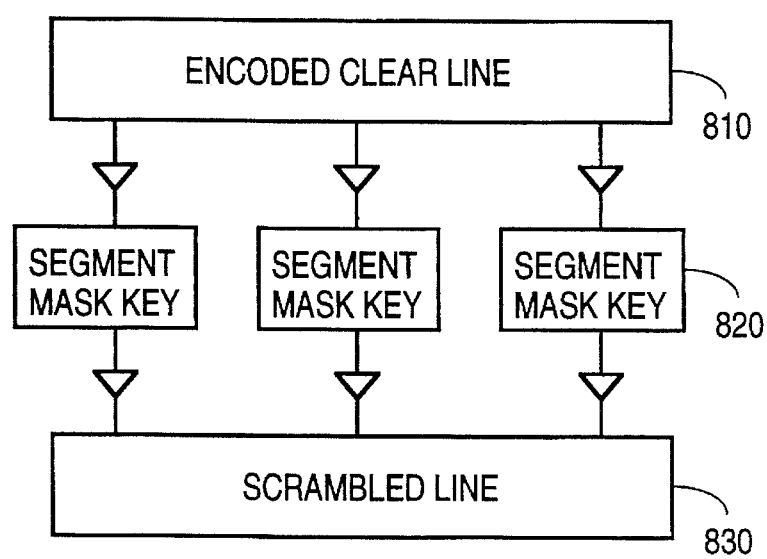
FIG. 9 illustrates a segment mask key method in which individual line segments in line 810, are masked by a segment mask key, represented generally by reference numeral 820.

FIG. 9 illustrates a segment mask key method in which individual line segments in line 810, are masked by a segment mask key, represented generally by reference numeral 820. In one implementation, segment masking is accomplished by an array of "exclusive-or" gates. In that implementation, the "exclusive-or" gates perform the "exclusive-or" function upon the segment color information using a secondary key sequence K(n) created by FIG. 6's key algorithm to derive new segment colors.

Figure 10:
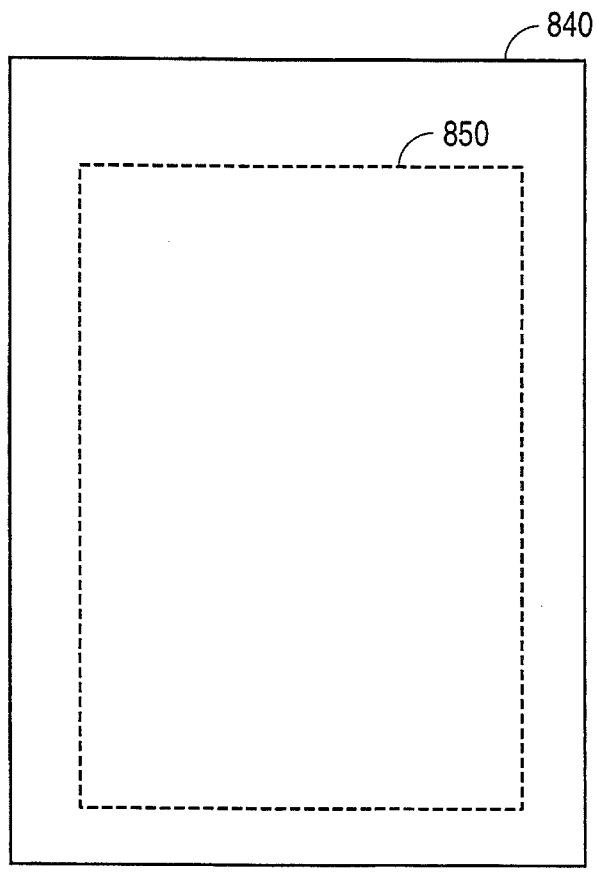
FIG. 10 shows a page of document 840 on which a template 850 is imprinted to designate an area within which the scrambled image is to be constructed.

FIG. 10 shows document construction sheet 840 on which a template 850 is imprinted to designate an area within which the image is to be scrambled. In this embodiment, only the image within the designated area will be scrambled and transmitted. The space outside of the designated area is reserved for placement of alignment markers, which are used to position the scrambled image for descrambling. Thus, the creator of the clear text document must confine the secured image to be within the designated area to prevent loss of data.

As mentioned above and illustrated in FIG. 11, a scrambling by-pass marker (e.g. FIG. 11's scrambling by-pass marker 910) can be imprinted or attached on a page to signal facsimile machine 100 to transmit the page without scrambling. Such a marker can be imprinted on the page prior to, or at the same time as, creation of the image to be transmitted. Alternatively, such a marker can be affixed to such a page as sticker. Facsimile machine 100 can recognize in memory such a marker using well-know pattern recognition techniques known in the art, such as bar-code recognition. As another example, a microprocessor or an electronic circuit can be used to compare the scanned image with a stored image of the scrambling bypass marker.

FIGS. 14 and 15 illustrates an additional method for designating a specific clear text area on a page to be scrambled. This method is applicable when it is unnecessary to transmit a full page of clear text. As shown in FIG. 14, a "start bypass" marker, represented by reference numeral 1200, indicates the beginning position of a clear text area 1400 within which the image is to be maintained as clear text in the facsimile transmission An "end bypass marker", represented by reference numeral 1500, indicates the ending position of the designated clear text area 1400. FIG. 15 shows one application of such a clear text area. As shown in FIG. 15, clear text area 1400 is used to specify that form 1600, which provides identification and routing information, is to be transmitted as clear text. Start bypass and end bypass markers 1200 and 1500 can be recognized in the same manner as scrambling bypass marker 910 of FIG. 11. Of course, designated clear text area, including start bypass and end bypass markers 1200 and 1500 can be provided on preprinted stationery, as an adhesive "sticker", or generated by a wordprocessor. One method to provide the ability to transmit such a designated clear text area is to map segments within the designated clear text area are mapped to themselves during both scrambling and descrambling operations.

The present invention thus provides a method which generates a scrambled document, which can be printed out and viewed. In the methods described in conjunction with FIGS. 6–9, and similar methods, the scrambled document maintains not only the privacy of its content but also all the visible elements of the document to allow descrambling from the scrambled image. The methods used in the present invention are independent of the underlying protocol, data structure and data communication media, so that the present invention can be applied to existing communication and facsimile standards without modification.

While the invention has been shown and will be described in some detail with reference to a particular embodiment thereof, there is no intention that it thus be limited to such detail. On the contrary, it is intended here to cover all alternatives, modifications and equivalents falling within the spirit and scope of the invention as defined by the appended claims.

We claim:

1. A method for scrambling an image, comprising the steps of:

receiving a scrambling key;

storing said image in a first storage device as image data in accordance with a first data structure;

dividing said image data into a plurality of data segments, each data segment being image data corresponding to one of a plurality of designated areas in said image under a first mapping between said data segments and said designated areas;

scrambling said plurality of data segments in a pseudo-random manner using a scrambling algorithm which receives as input said scrambling key and providing as output a scrambled image formed by associating said data segments and said designated areas under a second mapping, different from said first mapping, between said data segments and said designated areas; and storing said scrambled image in said first storage device as image data in accordance with a second data structure.

2. A method as in claim 1, further comprising the step of providing alignment markers to said scrambled image.

3. A method as in claim 1, further comprising the step of providing a second scrambling key, said scrambling algorithm receives as input both said first scrambling key and said second scrambling key.

4. A method as in claim 1, further comprising the step of transforming said scrambled image in said second data structure to a format suitable for data transmission.

5. A method as in claim 1, further comprising the step of providing as output a display of said scrambled image.

6. A method as in claim 1, further comprising the step of descrambling in a pseudo-random manner said plurality of data segments stored in accordance with said second data structure, using a descrambling algorithm which receives as input said scrambling key and providing as output a descrambled image formed by associating said data segments and said designated areas under said first mapping between said data segments and said designated area.

7. A method as in claim 1, wherein each of said first and second mappings between said data segments and said designated areas is one-to-one.

8. In an image scrambling or encryption application, a method for providing one or more keys to be used in a scrambling or encryption algorithm, comprising the steps of:

determining whether a first key used for data scrambling is to be received and, if said first key is to be received, receiving said first key, said first key deriving from a sequence of symbols representing keys activated from a keyboard;

determining whether a second key for data scrambling is to be received and, if said second key is to be received, receiving from a non-volatile storage medium a second key; and applying said algorithm to an image using (i) if only said first key is received, said first key; (ii) if only said second key is received, said second key; and (iii) if both said first and second keys are received, using both said first and said second keys.

9. A method as in claim 8, wherein said second key comprises a key table.

10. A method as in claim 8, wherein said second key comprises data encoding a data scrambling or encryption algorithm.

11. A method as in claim 8, wherein said step of applying said algorithm includes the step of generating a secondary key from (i) said first key, if only said first key is received, (ii) said second key, if only said second key is received; and (iii) both said first and second keys, if both said first and second keys are received.

12. A method as in claim 11, wherein said step of generating secondary keys, if both said first and second keys are received, create a secondary key by combining said first and second keys with a predetermined third key.

13. A method as in claim 9, wherein said step of applying said algorithm includes the steps of:

representing said image as a data structure in an electronic memory device, said data structure partitioning said images into a plurality of lines arranged in accordance with a first sequence; and rearranging said plurality of lines in said data structure in accordance with a second sequence, said second sequence being derived from said secondary key.

14. A method as in claim 9, wherein said step of applying said algorithm includes the steps of:

representing said image as a data structure in an electronic memory device, said data structure partitioning said images into a one or more lines, and within each line, into a plurality of segments, said segments in each line being arranged in accordance with a first sequence; and rearranging said segments in one of said lines in said data structure in accordance with a second sequence, said second sequence being derived from said secondary key.

15. A method as in claim 13, further comprising the step of descrambling, said step of descrambling rearranges said plurality of lines in said data structure from said second sequence to said first sequence.

16. A method as in claim 14, further comprising the step of descrambling, said step of descrambling rearranges said segments in said line in said data structure from said second sequence to said first sequence.

17. A method as in claim 14, wherein each of said segments in said data structure is associated with colors in said image, said method further comprising the steps of:

creating a segment mask, said segment mask specifying a mapping of colors; and applying said segment mask to each of said segments to change said colors of said segments in accordance with said mapping of colors, prior to said step of rearranging.

18. A method as in claim 17, where in said colors of said image are represented by binary digits, and wherein said step of applying said segment mask comprises applying an exclusive-or function to said binary digits.

19. A method as in claim 1, wherein said method is used in a facsimile machine.

20. A method as in claim 8, wherein said method is used in a facsimile machine.

21. A method as in claim 6, further comprising, prior to said step of descrambling, the steps of:

providing said scrambled image in hard copy form; and scanning said scrambled image in hard copy form and providing in a second storage device, said second storage device need not be the same as said first storage device, said scanned scrambled image as image data in accordance with said second data structure.

22. A method as in claim 1, wherein said method is implemented in an application-specific integration circuit.

23. A method as in claim 8, wherein said method is implemented in an application-specific integration circuit.

24. A method as in claim 1, wherein said method is implemented as a program in a computer.

25. A method as in claim 8, wherein said method is implemented as a program in a computer.

26. A sheet of paper on which is printed a marker indicating an area on said sheet of paper, said area designating that any image outside said area on said sheet of paper is to remain as clear text in a facsimile transmission.

27. A marker comprising a machine-readable design to be affixed to a designated area of a sheet of paper for specifying that any image printed on said sheet of paper is to be transmitted in a facsimile transmission as clear text.

28. A marker as in claim 27, wherein said marker is printed on paper coated on one side with an adhesive material, such that said marker is to be affixed to said sheet of paper by said adhesive material.

29. A marker as in claim 28, wherein said marker is generated by a wordprocessor on said sheet of paper.

30. An apparatus on a sheet of paper containing an image to be transmitted, comprising:

a first symbol for designating a first portion of a boundary on said sheet of paper; and a second symbol for designated the remaining of said boundary on said sheet of paper, said boundary enclosing a portion of said image and designated said portion of said image to be transmitted as clear text.

31. An apparatus as in claim 30, wherein said apparatus is provided on paper coated on one side with an adhesive material, such that said apparatus is to be affixed to said sheet of paper by said adhesive material.

32. An apparatus as in claim 30, wherein said apparatus is generated by a wordprocessor on said sheet of paper.

* * * * *